(12) United States Patent
Schumacher

(10) Patent No.: US 9,909,909 B2
(45) Date of Patent: Mar. 6, 2018

(54) FLOW MEASUREMENT SYSTEM FOR SINGLE-USE CONTAINERS

(71) Applicant: Rosemount Inc., Chanhassen, MN (US)

(72) Inventor: Mark S. Schumacher, Minneapolis, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 15/072,128

(22) Filed: Mar. 16, 2016

(65) Prior Publication Data
US 2017/0268913 A1 Sep. 21, 2017

(51) Int. Cl.
*G01F 1/44* (2006.01)
(52) U.S. Cl.
CPC ..................... *G01F 1/44* (2013.01)
(58) Field of Classification Search
CPC ................... G01F 1/38; A61B 5/08
USPC ...................... 73/861.47; 600/538
See application file for complete search history.

(56) References Cited

U.S. PATENT DOCUMENTS

| | | | | |
|---|---|---|---|---|
| 3,374,674 A | * | 3/1968 | Schwartzman | G01F 1/20 73/861.63 |
| 3,821,897 A | * | 7/1974 | Frazel | G01F 1/386 137/85 |
| 4,297,871 A | * | 11/1981 | Wright | A61B 5/097 600/532 |
| 4,599,906 A | | 7/1986 | Freud et al. | |
| 4,989,456 A | * | 2/1991 | Stupecky | A61B 5/0876 138/46 |
| 6,979,307 B2 | * | 12/2005 | Beretta | A61B 17/00491 210/515 |
| 7,924,017 B2 | | 4/2011 | Ammann et al. | |
| 8,123,397 B2 | | 2/2012 | Baumfalk et al. | |
| 8,252,582 B2 | | 8/2012 | Baumfalk et al. | |
| 2005/0163667 A1 | | 7/2005 | Krause | |
| 2005/0256447 A1 | | 11/2005 | Richardson et al. | |
| 2012/0244609 A1 | | 9/2012 | Selker et al. | |
| 2013/0145818 A1 | | 6/2013 | Allgauer et al. | |
| 2014/0207016 A1 | * | 7/2014 | Addington | A61M 15/0036 600/538 |

OTHER PUBLICATIONS

International Search Report and Written Opinion for International Patent Application No. PCTUS2017/019563. dated May 25, 2017, 13 pages.

* cited by examiner

*Primary Examiner* — Jewel V Thompson
(74) *Attorney, Agent, or Firm* — Christopher R. Christenson; Kelly, Holt & Christenson PLLC

(57) ABSTRACT

A venturi flowmeter for connection to single-use containers is provided. The venturi flowmeter includes a meter body formed of a polymer and configured to allow fluid flow therethrough. A first annular diaphragm is mounted proximate an inner surface of the meter body has a first internal diameter. A second annular diaphragm is mounted proximate an inner surface of the meter body has a second internal diameter different from the first internal diameter.

18 Claims, 4 Drawing Sheets

US 9,909,909 B2

FLOW MEASUREMENT SYSTEM FOR SINGLE-USE CONTAINERS

BACKGROUND

Single-use containers, such as bioreactors are useful for generating and supporting biological reactions for any number of purposes. The life sciences industry is moving from large, capital-intensive facilities made of stainless steel with large clean-in-place (CIP) infrastructure to smaller facilities that use polymeric bags or containers functioning as bioreactors. The bioreactor bag is used once and then discarded. The single-use bioreactor technique significantly reduces the capital cost of the plant. For example, in existing facilities that use stainless steel CIP infrastructure, up to 90% of the cost of operating the facility may be due to the clean-in place infrastructure, including very high end instrumentation designed to withstand a steam cleaning cycle. By moving to disposable, single-use bioreactor bags, the CIP portion of the capital can be eliminated and the facility can be more flexible and much smaller, which, in turn, allows the production of smaller batches that are needed for more targeted drug therapies and other smaller-scale applications.

As pharmaceutical manufacturers change over from large stainless steel process vessels to smaller-volume, pre-sterilized, disposable plastic bag systems, there is a need to measure process variables in these systems in order to control the growth environment and subsequent processes. Typically, pharmaceutical manufacturers and the life science industry, in general, have used relatively inexpensive sensors and relatively crude methods from fluid isolation, such as silicone gel. These methods can lead to inaccurate measurements, which are generally unacceptable to the life sciences industry for supporting the various biological reactions.

SUMMARY

A venturi flowmeter for connection to single-use containers is provided. The venturi flowmeter includes a meter body formed of a polymer and configured to allow fluid flow therethrough. A first annular diaphragm is mounted proximate an inner surface of the meter body has a first internal diameter. A second annular diaphragm is mounted proximate an inner surface of the meter body has a second internal diameter different from the first internal diameter.

DETAILED DESCRIPTION

Users of single-use containers, such as bioreactors, desire a relatively inexpensive and relatively accurate set of instrumentation for use with such containers. Important drivers for such single-use plastic containers are dramatically lower capital costs, as described above, no clean-in-place infrastructure, faster batch turnaround times, and smaller and more flexible process capabilities. While some developments have been undertaken in order to provide high quality pressure and level measurement with respect single-use containers, no solutions are currently provided for measuring the flow of a fluid to or from such a single-use container.

Embodiments of the present invention generally provide an effective solution for measuring the flow relative to a single-use container, such as a bioreactor. In accordance with an embodiment of the present invention a polymeric venturi-based flowmeter is used in conjunction with a relatively high quality differential pressure measurement device. Portions of the venturi flowmeter that contact the flowing fluid are constructed with relatively low-cost polymers, such as plastic, that can be pre-sterilized. The venturi flowmeter is then fluidically coupled, in one embodiment, to the relatively high quality differential pressure measurement device. Note, while embodiments of the present invention are described with respect to a single differential pressure measurement device measuring pressures relative to a venturi flowmeter, embodiments of the present invention can be practiced with such measurements being performed by separate devices.

Fluid flow measurement presents a particular difficulty for single-use containers, such as bioreactors. In particular, these vessels often contain living cells or organisms. Such cells or organisms are often particularly susceptible to sheering stresses or other acute forces as they flow through the system. Thus, in order to effectively measure a flow parameter relative to a liquid that may contain living cells or organisms, it is important to do so with as little disturbance to the flow profile as possible. For example, live cells that are transported in the tubes to and/or from a bioreactor must be treated with care so that they do not rupture or suffer other undesirable effects. Accordingly, some embodiments of the present invention generally provide a polymeric venturi with an appropriately large choke in order to be minimally disruptive to the flow of the fluid.

Figure 1:
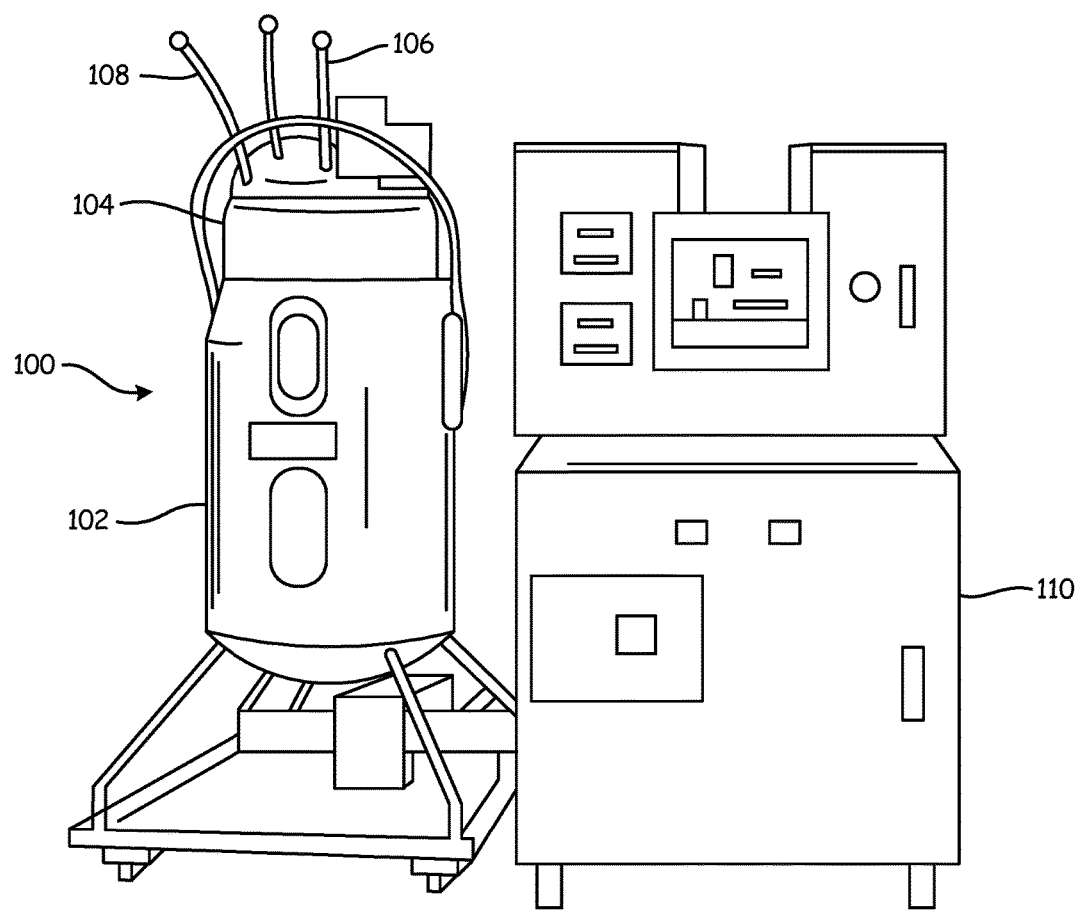
FIG. 1 is a diagrammatic view of a stainless steel permanent support equipment being used in conjunction with a bioreactor bag, with which embodiments of the present invention are particularly applicable.

FIG. 1 is a diagrammatic view of a bioreactor with which embodiments of the present are particularly applicable. Bioreactor 100 includes rigid support 102 containing polymeric bag 104 and a number of tubes 106, 108. Various sensors and/or tubes of the bioreactor are coupled to analyzer 110 that is able to measure or otherwise determine various aspects of the biological reaction and/or biological fluid therein, and provide information relative to the biological reaction and/or biological fluid. The polymeric flow measurement system in accordance with embodiments of the present invention will generally attach to one or more of tubes 106, 108 coupled to polymeric bag 104.

Figure 2:
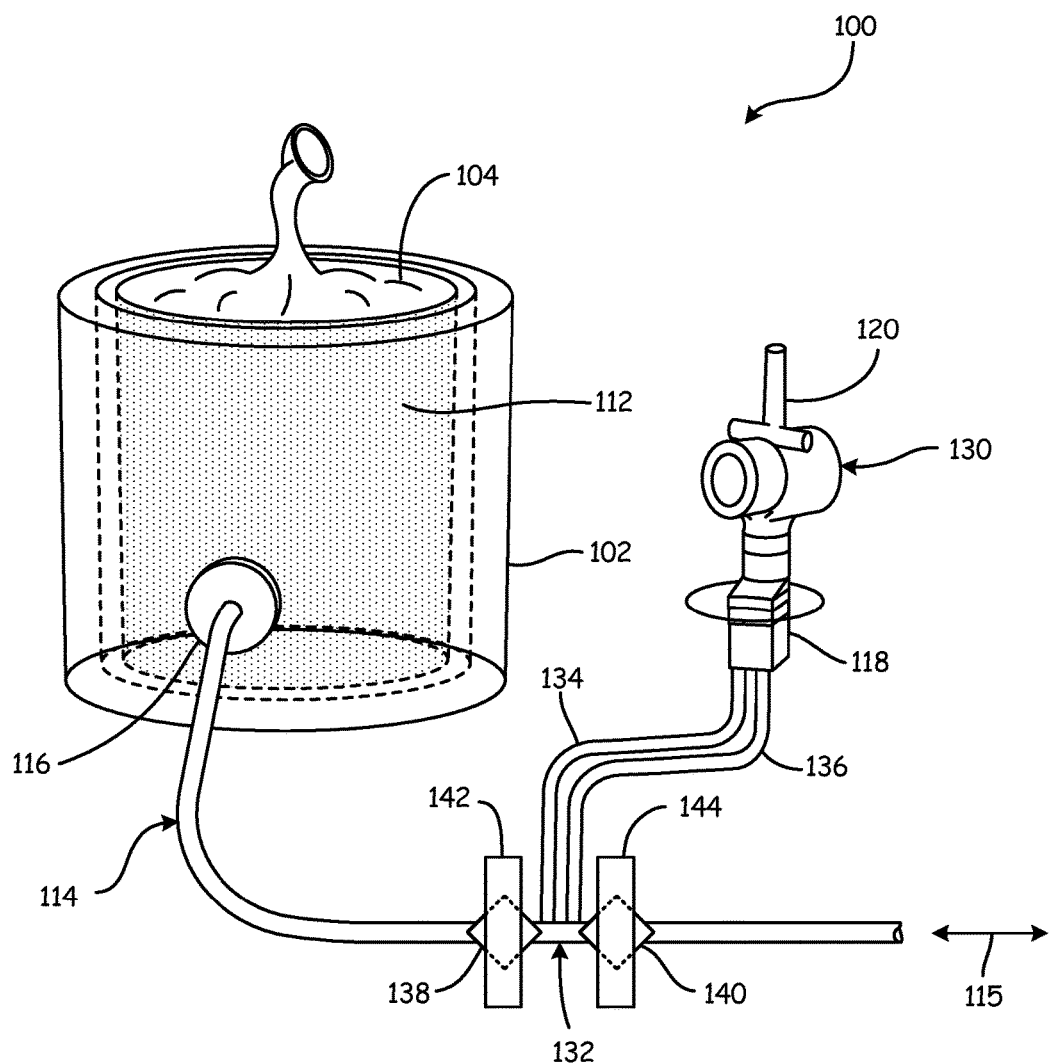
FIG. 2 is a diagrammatic view of a single-use container system with a sterilized flow measurement system in accordance with an embodiment of the present invention.

FIG. 2 is a diagrammatic view of polymeric bioreactor bag 104 disposed within rigid container 102. A biological fluid, such as a cell culture or fermentation mash liquid 112 is disposed within bioreactor bag 104 and undergoes a biological reaction of interest. A tube or hose 114 is coupled to the interior of polymeric bag 104 via port 116. Accordingly, any suitable fluid can flow to or from biological bag 104 via tubing 114, as indicated at bidirectional arrow 115.

As shown in FIG. 2, a pressure measurement device, such as differential pressure measurement transmitter 130 is fluidically coupled to venturi flowmeter 132 via liquid-filled impulse lines 134, 136. In one embodiment, the liquid in liquid-filled impulse lines 134, 136 is substantially incompressible, such as water or silicone oil that is isolated from the bioreacting fluid flowing through tubing 114 via a pair of annular isolation diaphragms (shown in FIG. 3). Moreover, any fluid that is substantially incompressible at the pressures of the fluid flowing through venturi flowmeter 132 can be used. Thus, if the venturi flowmeter is suitable for relatively low-pressure applications, then the fluids within lines 134, 136 can be slightly compressible as long as they are virtually incompressible relative to the pressures flowing through venturi flowmeter 132.

Venturi flowmeter 132 is coupled to cooperative fittings 138, 140 through any suitable couplings, such as known tri-clamp couplings 142, 144. As will be described in greater detail with respect to FIGS. 3 and 4, as fluid flows through venturi flowmeter 132, the fluid flow generates different pressures through liquid-filled impulse lines 134, 136. The pressure in lines 134, 136 is sensed, in one embodiment, by differential pressure measurement transmitter 130 and a value indicative of the measured differential pressure is converted, via hardware, software, or a combination thereof, to a flow-related value, such as flow velocity, or mass flow. Further, the pressure of the fluid itself may also be measured and indicated via any suitable techniques. Once differential pressure measurement transmitter 130 has measured or otherwise determined a flow-related value, the flow-related value can be displayed locally at the bioreactor, and/or communicated to a remote device. Further, in some embodiments, instrument 130 may also perform diagnostics relative to the device itself and/or the biological reaction in order to provide additional information instead of simply reporting the pressure within single-use bioreactor bag 104. Further still, instrument 130 may also be configured to convey the flow-related information to one or more additional devices via a process communication loop or segment, such as those in accordance with the Highway Addressable Remote Transducer (HART®) protocol or the FOUNDATION® Fieldbus protocol. However, other suitable process communication protocols, wired and/or wireless can be used in accordance with embodiments of the present invention. Moreover, embodiments described herein may also include wirelessly transmitting such flow-related information to any suitable device via antenna 120 in accordance with a wireless process communication protocol, such as IEC62591. In one embodiment, instrument 130 is a commercially-available hygienic pressure transmitter sold under the trade designation Model 3051 available from Emerson Process Management of Shakopee, Minn.

Figure 3:
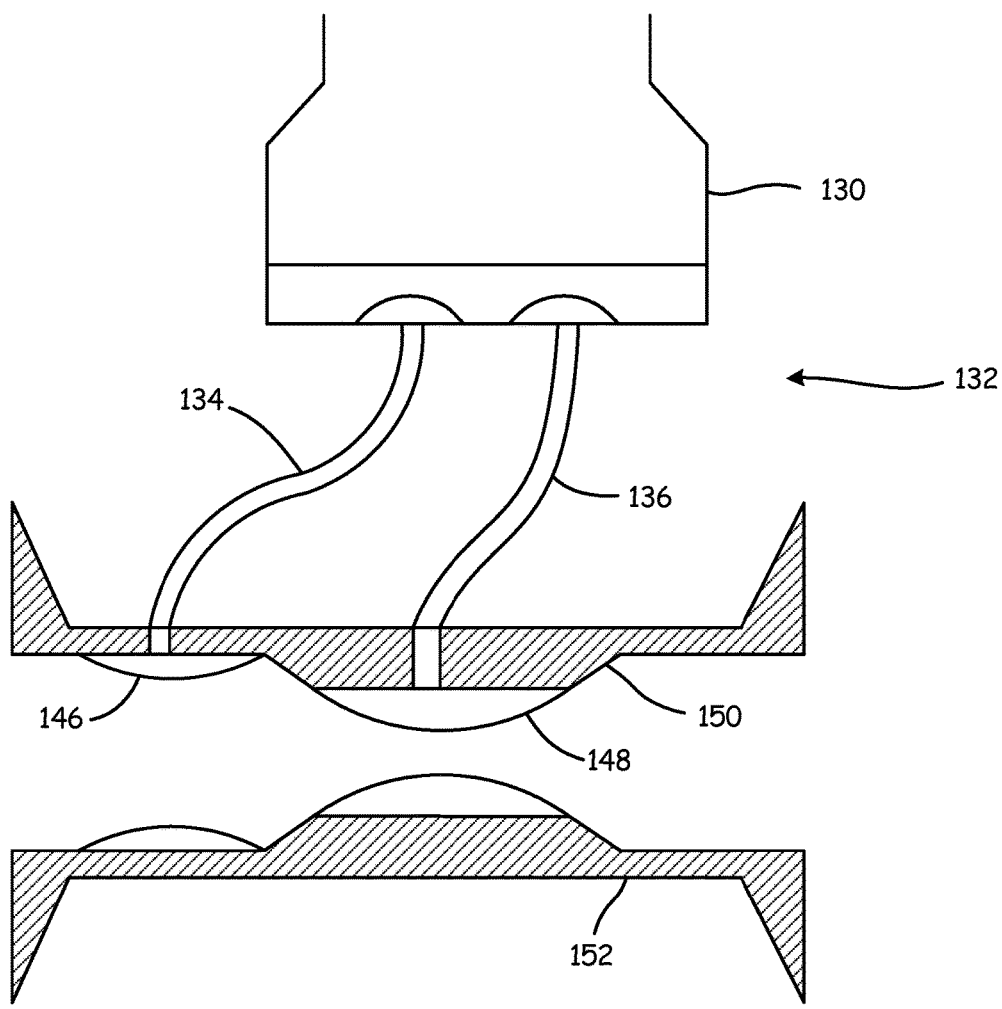
FIG. 3 is a diagrammatic cross-sectional view of a venturi flowmeter using annular seals in accordance with an embodiment of the present invention.

FIG. 3 is a diagrammatic cross-sectional view of a venturi flowmeter in accordance with an embodiment of the present invention. Venturi flowmeter 132 is, in one embodiment, formed of a plastic that is amenable to radiation sterilization, such as by using gamma radiation. Venturi flowmeter 132 includes a pair of annular diaphragms 146, 148 that are fluidically coupled to respective liquid-filled impulse lines 134, 136. Each annular diaphragm is generally formed of a rectangular portion of flexible polymer that has its longer sides aligned transverse to the axis of meter body 152 thereby forming a ring, or at least partial ring, about the internal diameter of meter body 152.

While embodiments of the present invention can be practiced where annular diaphragms 146 and 148 do not extend fully around the internal diameter of meter body 152, at least one embodiment includes annular diaphragms extending entirely about the internal diameter of meter body 152. Additionally, as shown in FIG. 3, annular diaphragms 146, 148 are disposed about the internal diameter of meter body 152 at locations that have different diameters. As shown, annular diaphragm 146 is provided at a relatively large-diameter portion of the inside diameter of meter body 152, while annular diaphragm 148 is disposed at necked-down region 150 having a relatively smaller diameter than the portion to which annular diaphragm 146 is coupled. In one embodiment, annular diaphragms 146, 148 are formed from plastic and formed to the inner surface of meter body 152 and plastic-welded in place. Accordingly, each annular diaphragm 146, 148 moves in response to pressure changes in meter body 152. This movement is, in turn, communicated to another diaphragm, such as a sensing diaphragm in differential pressure measurement transmitter 130 via liquid-filled impulse lines 134, 136. Venturi flowmeter 132 provides an effective differential pressure producer with satisfactory range ability, high pressure recovery, and strong signal production. By using one annular seal upstream of the venturi and another downstream, the differential pressure signal communicated to the differential pressure transmitter 130 is easily converted by differential pressure transmitter 130 into a flow-related value such as flow velocity or mass flow rate and communicated to any suitable device and/or indicated locally by differential pressure transmitter 130.

In accordance with the embodiments of the present invention, meter body 152 and the seal system may be formed of materials of sufficiently low cost that the entire system, with the exception of differential pressure transmitter 130, can be considered to be disposable. In one embodiment, the venturi/seal system is delivered to an end-user in a pre-sterilized condition and ready to be connected to a single-use container. In contrast, the differential pressure transmitter, such as transmitter 130, is a permanent part of the infrastructure that supports the biological reaction process. This approach uses the high performance differential pressure transmitter 130 and allows the user to retain all of the support infrastructure including potential FDA traceability.

Figure 4:
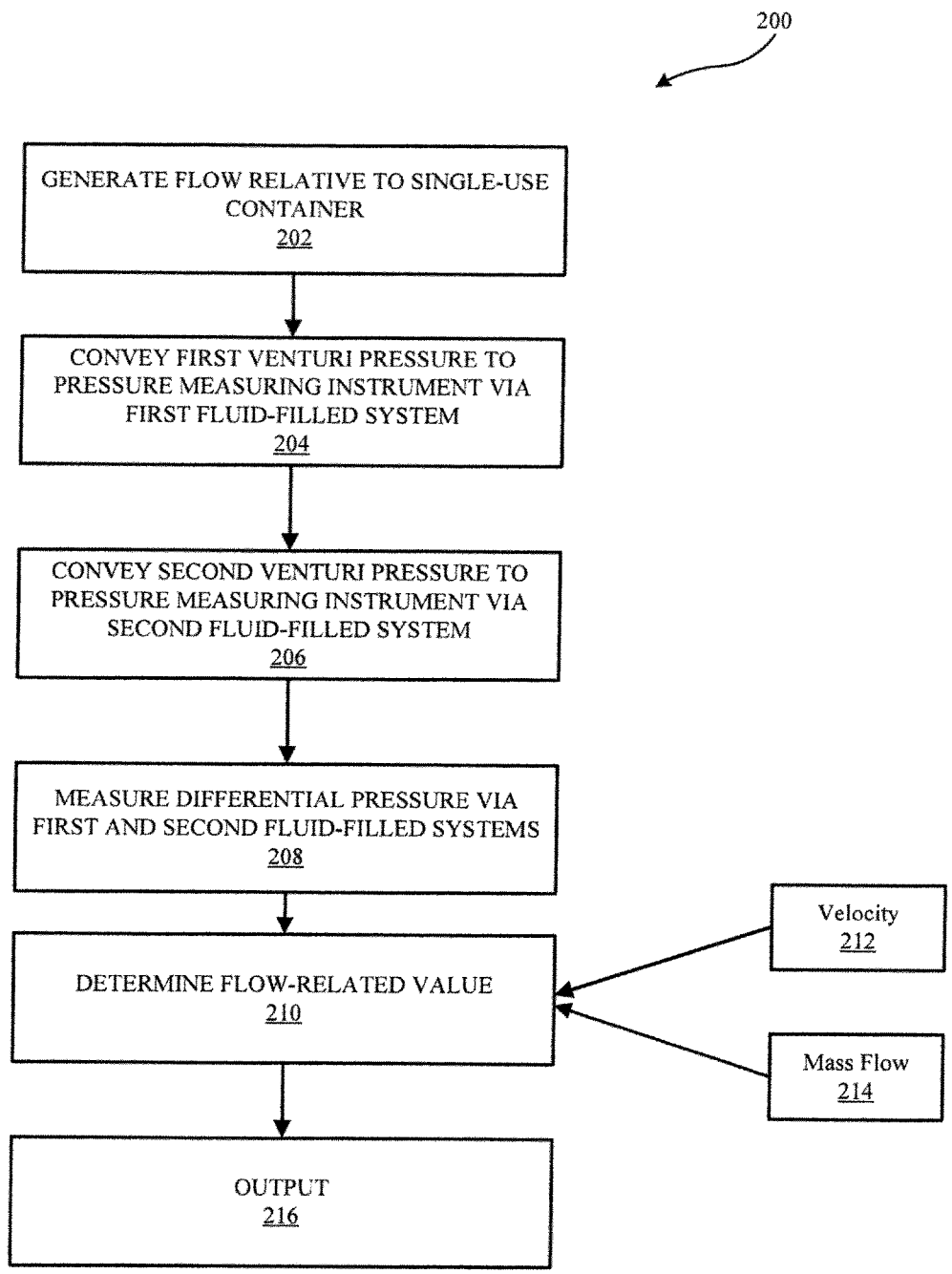
FIG. 4 is a flow diagram of a method of generating a flow value relative to a flow of fluid from or to a single-use container in accordance with an embodiment of the present invention.

FIG. 4 is a flow diagram of a method of measuring a flow quantity relative to a fluid flowing to or from a single-use container in accordance with an embodiment of the present invention. Method 200 begins at block 202 where a flow is generated relative to the single-use container. This flow may be into the container or from the container. Next, at block 204 a first venturi pressure is conveyed to a pressure measurement device via a fluid-filled isolation system. An example of block 204 is a pressure being conveyed from meter body 152 to differential pressure measurement transmitter 130 via fluid-filled impulse line 134. At block 206, a second venturi pressure is conveyed to a pressure measurement device via a second fluid fill system. An example of this is pressure from annular diaphragm 148 being conveyed to differential pressure measurement transmitter 130 via fluid-filled impulse line 136. However, those skilled in the art will recognize that blocks 204 and 206 can be performed using two different pressure measurement devices. Moreover, the description of first and second pressures is not intended to indicate that one happens after the other. Instead, "first" and "second" are merely provided as labels in order to enhance clarity. Next, at block 208, differential pressure between the pressures provided by the first and second fluid fill systems is measured. In one embodiment, this is accomplished by directly measuring a differential pressure between the pressures conveyed by fluid-filled impulse lines 134 and 136. However, embodiments of the present invention can be practiced where each pressure is measured individually and the difference is calculated. Moreover, each individual pressure measurement could be done by a separate device, and the difference could be calculated by still another device.

Next, at block 210 a flow value is determined based on the measured differential pressure. In one embodiment, the flow value may be flow velocity 212, while in another embodiment, the flow value may be a mass flow rate 214. Finally, at block 216, the flow value is provided as an output. This output can be provided locally by a device, such as differential pressure measurement transmitter 130, or remotely, to a process controller or monitoring device via process communication, such as that set forth above.

Embodiments of the present invention provide a low-cost solution for flow measurement related to single-use containers, such as bioreactors. Devices constructed in accordance with embodiments of the present invention may be easily sterilized on site, and/or during manufacture. When such devices are sterilized during manufacture, they may be provided in sterile packaging so that an end user need not perform any sterilization prior to use. Moreover, the system may be provided having the liquid-filled impulse lines pre-filled, such that an end user need only remove a shipping cap from each line and place a membrane or flexible diaphragm of each impulse line against a respective isolation diaphragm of the differential pressure transmitter. Of course, embodiments may also be practiced where the liquid-filled impulse lines are filled on the user's site during setup.

Although the present invention has been described with reference to preferred embodiments, workers skilled in the art will recognize that changes may be made in form and detail without departing from the spirit and scope of the invention.

What is claimed is:

1. A venturi flowmeter for connection to single-use containers, the venturi flowmeter comprising:
   a meter body formed of a polymer and configured to allow fluid flow therethrough;
   a first annular diaphragm mounted proximate an inner surface of the meter body having a first internal diameter;
   a second annular diaphragm mounted proximate an inner surface of the meter body having a second internal diameter different from the first internal diameter; and
   a first impulse line coupled to the first annular diaphragm, the first impulse line having a substantially incompressible fluid therein.

2. The venturi flowmeter of claim 1, wherein the meter body is formed of plastic.

3. The venturi flowmeter of claim 1, wherein each of the first and second annular diaphragms is constructed from plastic.

4. The venturi flowmeter of claim 1, wherein at least one of the first and second annular diaphragm extends entirely about an internal diameter of the meter body.

5. The venturi flowmeter of claim 1, wherein the venturi flowmeter is sterilized and disposed within sterile packaging.

6. The venturi flowmeter of claim 1, and further comprising a second impulse line coupled to the second annular diaphragm, the second impulse line having a substantially incompressible fluid therein.

7. The venturi flowmeter of claim 6, wherein each of the first and second impulse lines is filled with water.

8. The venturi flowmeter of claim 6, wherein the meter body, first impulse line, and second impulse line are disposed within sterile packaging.

9. The venturi flowmeter of claim 6, wherein each of the first and second impulse lines is fluidically coupled to a pressure measuring instrument.

10. The venturi flowmeter of claim 9, wherein each of the first and second impulse lines is fluidically coupled to the same pressure measuring instrument.

11. The venturi flowmeter claim 10, wherein the pressure measuring instrument is a differential pressure transmitter.

12. The venturi flowmeter of claim 11, wherein the differential pressure transmitter is configured to measure a differential pressure between pressure in the first and second impulse lines and determine a flow-related value output.

13. The venturi flowmeter of claim 12, wherein the flow-related value output is conveyed in accordance with a process communication protocol.

14. The venturi flowmeter of claim 13, wherein the process communication protocol is a wireless process communication protocol.

15. A method of measuring flow of a bioreacting fluid, the method comprising:
   providing a venturi meter body formed of a polymer;
   generating a flow of the bioreacting fluid through the venturi meter body;
   measuring a difference between a first venturi pressure relative to a first location in the meter body and a second venturi pressure relative to a second location in the meter body having a diameter that is different than a diameter of the first location in the meter body;
   determining a flow-related value of the bioreacting fluid based on the measured difference in the first and second venturi pressures; and
   providing the flow-related value as an output.

16. The method of claim 15, wherein measuring the first venturi pressure is performed by coupling an annular diaphragm at the first location to a pressure measuring instrument.

17. The method of claim 16, wherein measuring the second venturi pressure is performed by coupling an annular diaphragm at the second location to the pressure measuring instrument.

18. The method of claim 15, wherein determining the flow-related value is performed by a differential pressure transmitter.

* * * * *